US008464010B2

(12) United States Patent
Beeken et al.

(10) Patent No.: US 8,464,010 B2
(45) Date of Patent: Jun. 11, 2013

(54) APPARATUS AND METHOD FOR DATA BACKUP (75) Inventors: Christopher B. E. Beeken, Eastleigh (GB); Carlos F. Fuente, Portsmouth (GB); Colin R. Jewell, Chandler's Ford (GB); William J. Scales, Portchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/463,659

(22) Filed: May 3, 2012

(65) Prior Publication Data

US 2012/0221815 A1 Aug. 30, 2012

Related U.S. Application Data (63) Continuation of application No. 12/763,108, filed on Apr. 19, 2010.

(30) Foreign Application Priority Data

Jun. 15, 2009 (EP) .................................... 09162728

(51) Int. Cl.
*G06F 12/00* (2006.01)
*G06F 13/00* (2006.01)
*G06F 13/28* (2006.01)

(52) U.S. Cl.
USPC ......................................... 711/162; 711/161

(58) Field of Classification Search
USPC .................................................. 711/161, 162
See application file for complete search history.

(56) References Cited

U.S. PATENT DOCUMENTS

| 6,957,362 | B2 | 10/2005 | Armangau |
| 7,085,901 | B2 | 8/2006 | Homma et al. |
| 7,386,695 | B2 | 6/2008 | Fuente |
| 8,051,259 | B2 * | 11/2011 | Agombar et al. ............. 711/159 |
| 8,195,620 | B2 * | 6/2012 | Agombar et al. ............. 707/674 |
| 2003/0191916 | A1 | 10/2003 | McBrearty et al. |
| 2006/0080362 | A1 | 4/2006 | Wagner et al. |
| 2008/0189482 | A1 * | 8/2008 | Fuente ......................... 711/112 |
| 2009/0106332 | A1 * | 4/2009 | Agombar et al. ............. 707/204 |
| 2009/0319735 | A1 * | 12/2009 | Agombar et al. ............. 711/162 |
| 2011/0289291 | A1 * | 11/2011 | Agombar et al. ............. 711/162 |

OTHER PUBLICATIONS

International Search Report dated Sep. 6, 2010 for Counterpart Application No. PCT/EP2010/058046.

* cited by examiner

*Primary Examiner* — Michael Alsip
(74) *Attorney, Agent, or Firm* — Griffiths & Seaton PLLC (57) ABSTRACT A targeting storage component selects a target virtual disk for one of a full copy or an incremental copy of first data. A periodic backup component triggers a periodic point-in-time copy of the first data to a virtual disk in the cascade. A testing component tests a status of the full copy, the incremental copy and the periodic point-in-time copy. Responsive to the status, a cascade splitting component splits the cascade to remove a dependency relationship of at least one of the fully copy, the incremental copy and the periodic point-in-time copy on the first data.

7 Claims, 9 Drawing Sheets

APPARATUS AND METHOD FOR DATA BACKUP

PRIORITY CLAIM

This application is a Continuation of U.S. patent application Ser. No. 12/763,108, filed on Apr. 19, 2010, which claims priority to European Patent Application No. 09162728.1, filed Jun. 15, 2009, and entitled "Apparatus and Method for a Data Backup."

BACKGROUND OF THE INVENTION

1. Field of the Invention

The present invention relates to the field of backing up of data in computer systems and more specifically to an apparatus and method for providing periodic data backups while reducing the risk of data corruption or loss.

2. Description of Related Art

Users of computer systems have a need to create periodic backups of their production data while minimizing the storage used, the impact on the production I/O and the time that the backups are dependent on the production data. Minimizing the storage capacity used and the impact the chosen backup management mechanism has on the production data are obvious requirements for most users. Minimizing the time that backups are dependent on the production data is a requirement that comes from a user's need to protect backup data from loss of the production data. While the backups are dependent on the production data the system is protected from corruption of the production data but is not protected from its loss.

SUMMARY OF THE DESCRIBED EMBODIMENTS

Using a space-efficient FlashCopy® (FlashCopy is a Registered Trademark of IBM Corporation in the United States, other countries, or both) helps the user minimize the storage used for backups and that using a FlashCopy solution implemented using a cascade algorithm will minimize the impact of the backups on the production I/O. At the highest level, FlashCopy is a function where a second image of 'some data' is made available. This function is sometimes known in other system contexts as Point-In-Time copy, or $T_0$-copy. The second image's contents are initially identical to that of the first. The second image is made available 'instantly'. In practical terms this means that the second image is made available in much less time than would be required to create a true, separate, physical copy, and that this means that it can be established without unacceptable disruption to a using application's operation.

Once established, the second copy can be used for a number of purposes including performing backups, system trials, and data mining. The first copy continues to be used for its original purpose by the original using application. Contrast this with backup without FlashCopy, where the application must be shut down, and the backup taken, before the application can be restarted again. It is becoming increasingly difficult to find time windows where an application is sufficiently idle to be shut down. The cost of taking a backup is increasing. There is thus significant and increasing business value in the ability of FlashCopy to allow backups to be taken without stopping the business.

FlashCopy implementations achieve the illusion of the existence of a second image by redirecting read I/O addressed to the second image (henceforth Target) to the original image (henceforth Source), unless that region (also known as a "grain") has been subject to a write. Where a region has been the subject of a write (to either Source or Target), then to maintain the illusion that both Source and Target own their own copy of the data, a process is invoked which suspends the operation of the write command, and without it having taken effect, issues a read of the affected region from the Source, applies the read data to the Target with a write, then (and only if all steps were successful) releases the suspended write. Subsequent writes to the same region do not need to be suspended since the Target will already have its own copy of the data. This copy-on-write technique is used in many environments.

Some storage controllers allow a user to configure more than one target for a given source, also known as multiple target FlashCopy. This has a number of applications. For instance, different experiments could be run against each of the targets. Or the targets might be taken at different times (e.g. different days in the week), and allow historical access to the disk, perhaps for the purpose of recovering from some data corruption, such as might be caused by a virus. One form of multiple-target FlashCopy is cascaded FlashCopy.

Cascaded FlashCopy is disclosed in, for example, U.S. Pat. No. 7,386,695. In cascade implementations according to the disclosure of U.S. Pat. No. 7,386,695, such as the multiple target FlashCopy facility available with the IBM SAN Volume Controller (SVC), a write to the source disk for an area that has not yet been copied will result in the data being copied to just one of the target disks. For these implementations, a read I/O request submitted to a target disk may require FlashCopy to read data from the source disk, the target disk or another target disk in the cascade depending on which source or target disks have previously been written to.

Using these two technologies, it is now possible to construct a solution that will protect the production data from corruption up to the required recovery point objective (RPO). However the problem remains of how to protect the production data from loss up to the required RPO.

Approach 1

The user could take a full incremental copy and take regular space-efficient Flash Copies between retriggers of the full incremental copy. This solution gives the user an RPO for data loss equal to the time since the full copy was triggered. The RPO for data corruption is equal to the time since the last space-efficient FlashCopy was taken. If the data is lost the production system cannot be recovered from the space-efficient copies because these copies are dependent on the production data. The user must go back to the full copy which must be complete. If the data is lost before the full copy is complete the production data cannot be recovered. This means that users are exposed to data loss whenever they retrigger their full copy.

Approach 2

Another approach is for the user to take a full incremental copy of the production data. Then at regular intervals take a space-efficient FlashCopy of the full copy target and then retrigger the full incremental copy. This means that the user will have more frequent copies that are independent of the production data once the full copy has completed. However, while full copy is not complete the space-efficient copies taken using FlashCopy are dependent on the production data, so the act of retriggering causes the user temporarily to lose some data protection.

Both of the above approaches disadvantageously fail to provide a method of allowing users to maintain periodic copies of their production data that are available for recovery from data corruption and data loss while minimising the storage required and the impact on the production I/O.

The applicant thus believes that it is desirable to alleviate the disadvantages of the known art by providing an apparatus and method operable to provide periodic data backups while reducing the risk of data corruption or loss.

The present invention accordingly provides, in a first aspect, a backup control apparatus for periodic data backup in a virtualized storage system having a point-in-time copy function operable to copy first data into a cascade and comprising: a storage targeting component for selecting a target virtual disk for one of a full copy or an incremental copy of the first data; a periodic backup component for triggering a periodic point-in-time copy of the first data to a virtual disk in the cascade; a testing component for testing a status of the full copy, the incremental copy and the periodic point-in-time copy; and a cascade splitting component responsive to the status for splitting the cascade to remove a dependency relationship of at least one of the full copy, the incremental copy and the periodic point-in-time copy on the first data.

In one embodiment, the cascade splitting component is operable to selectively reattach the at least one of the full copy, the incremental copy and the periodic point-in-time copy at a different position in the cascade. In one embodiment, the cascade is controllable by means of a relocatable cascade disk mapping. In one embodiment, the point-in-time copy function comprises FlashCopy. In one embodiment, the relocatable cascade disk mapping comprises a FlashCopy Fdisk.

In one embodiment, the at least one of the full copy, the incremental copy and the periodic point-in-time copy comprises a space-efficient copy.

In a second aspect, there is provided a backup control method for periodic data backup in a virtualized storage system having a point-in-time copy function operable to copy first data into a cascade and comprising steps of: selecting, by a storage targeting component, a target virtual disk for one of a full copy or an incremental copy of the first data; triggering, by a periodic backup component, a periodic point-in-time copy of the first data to a virtual disk in the cascade; testing, by a testing component, a status of the full copy, the incremental copy and the periodic point-in-time copy; and responsive to the status, splitting, by a cascade splitting component, the cascade to remove a dependency relationship of at least one of the full copy, the incremental copy and the periodic point-in-time copy on the first data.

In one embodiment, the cascade splitting component is operable to selectively reattach the at least one of the full copy, the incremental copy and the periodic point-in-time copy at a different position in the cascade. In one embodiment, the cascade is controllable by means of a relocatable cascade disk mapping. In one embodiment, the point-in-time copy function comprises FlashCopy. In one embodiment, the relocatable cascade disk mapping comprises a FlashCopy Fdisk. In one embodiment, the at least one of the full copy, the incremental copy and the periodic point-in-time copy comprises a space-efficient copy.

In a third aspect, there is provided a computer program comprising computer program code to, when loaded into a computer system and executed thereon, cause the computer system to perform the steps of a method according to the second aspect.

The illustrated embodiments of the present invention thus advantageously provide a method for providing storage-efficient periodic data backups while reducing the risk of data corruption or loss.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1A:
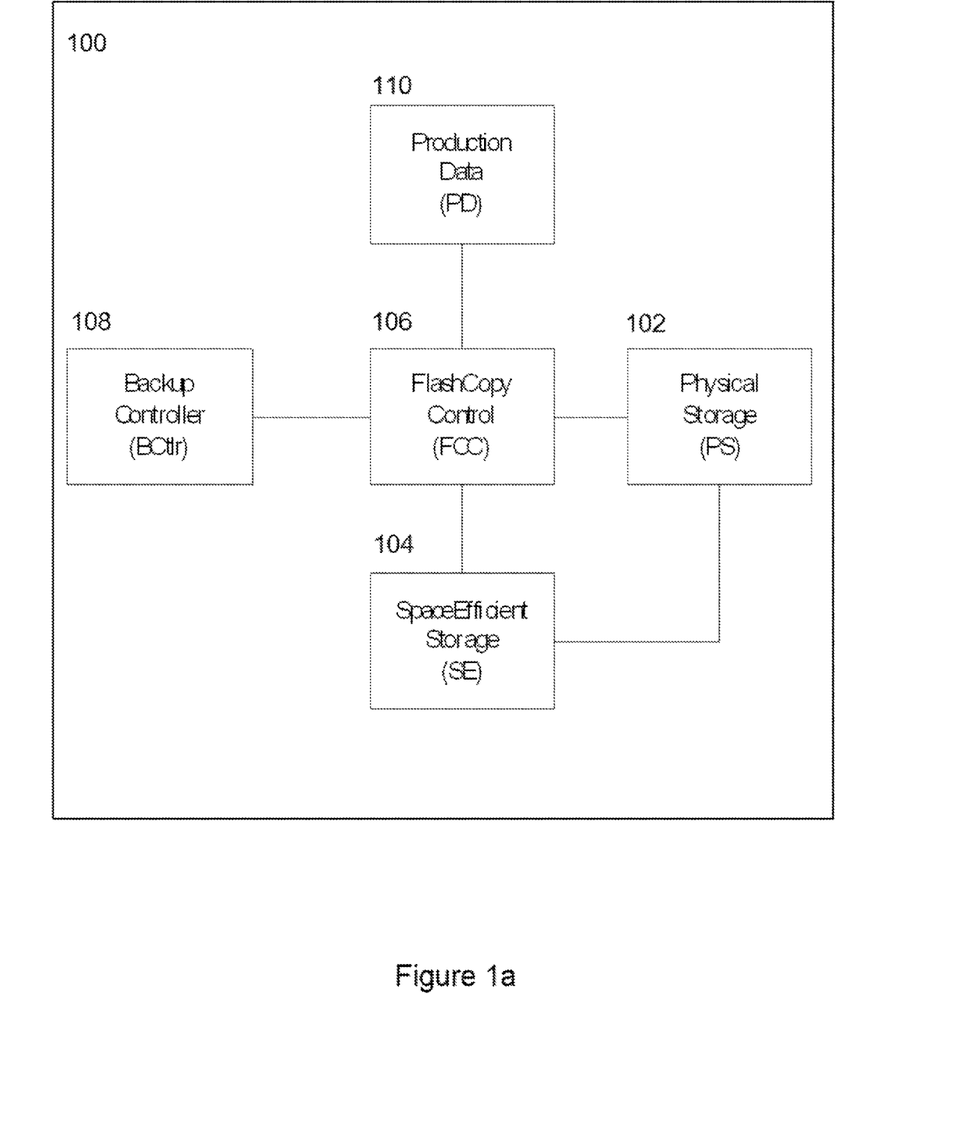
FIG. 1a is a block diagram illustrating an apparatus in which an embodiment of the present invention may be implemented.

FIG. 1a shows an arrangement of apparatus 100 suitable for the implementation of a data backup system according to one embodiment. Physical Storage (PS) 102 is the store of physical storage available for backing up the production data. Space Efficient Storage (SE) 104 is the store of space-efficient storage available for backing up the production data. Flash-Copy Control (FCC) 106 controls the creation of the storage required for the backup, the creation, start and stop of the FlashCopies required for the backup scheme. Backup Controller (BCtlr) 108 controls the sequence of events required to successfully execute the backup policy. Production Data (PD) 110 is the production data.

Figure 1B:
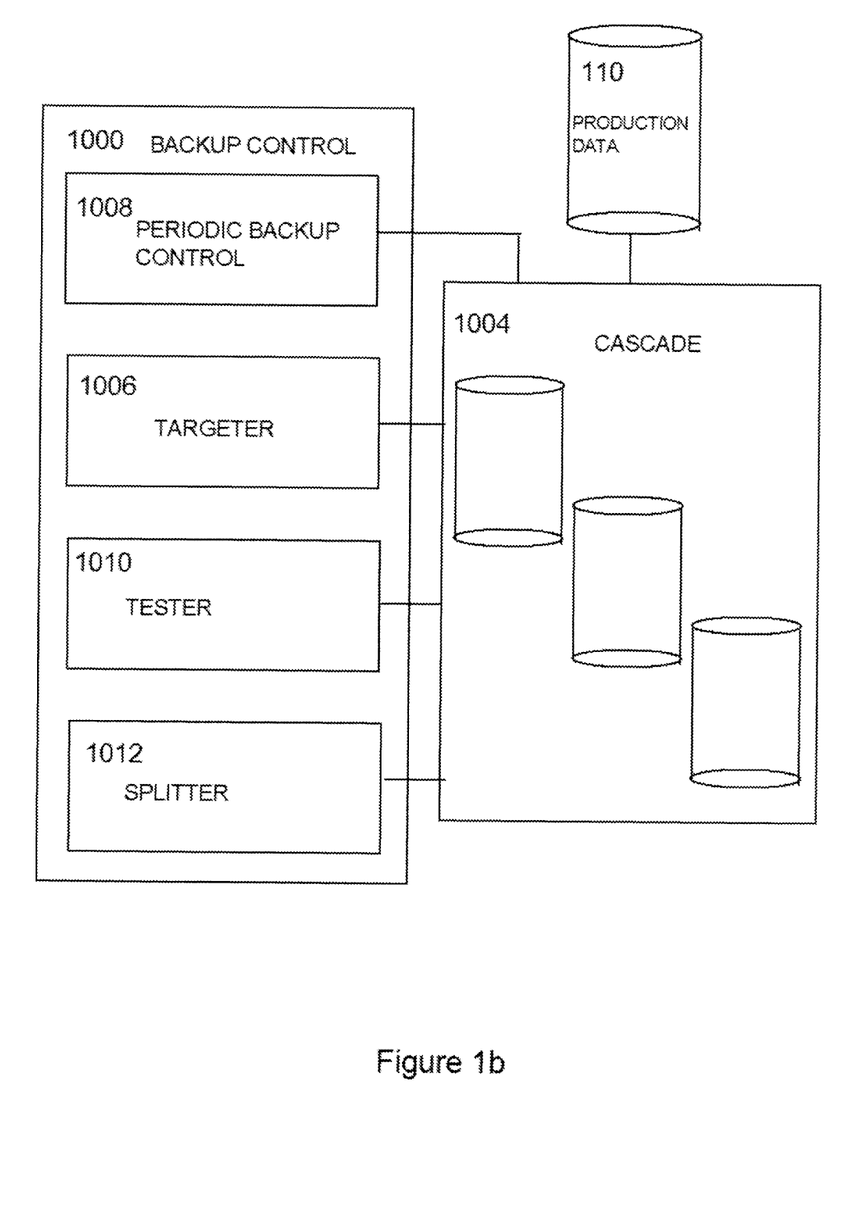
FIG. 1b is a block diagram illustrating an apparatus according to one embodiment of the present invention.

FIG. 1b illustrates a portion of an exemplary apparatus 1000 for data backup according to an embodiment of the invention. The apparatus is operable with a point-in-time copy function to copy production data 110 into a cascade 1004, and comprises a storage targeting component 1006 for selecting a target virtual disk for a full or incremental copy of the production data 110, and a periodic backup component 1008 for triggering a periodic point-in-time copy of the production data 110 to a virtual disk in the cascade 1004. Apparatus 1000 also comprises a testing component 1010 for testing a status of the full copy, the incremental copy and the periodic point-in-time copy and a cascade splitting component 1012 responsive to the status for splitting the cascade 1004 to remove a dependency relationship of at least one of the full copy, the incremental copy and the periodic point-in-time copy on the production data 110.

In one embodiment, the backup control apparatus 1000 is arranged such that the cascade splitting component 1008 is operable to selectively reattach the at least one of the full copy, the incremental copy and the periodic point-in-time copy at a different position in the cascade.

In one embodiment, the backup control apparatus 1000 s arranged such that the full copy, the incremental copy and the periodic point-in-time copy may comprise space-efficient copies in which, although the target virtual disk is defined to the system (for example, to a host computer) as being of the same size as the source, it is in fact only as large as necessary to accommodate the actual data that has been written to the source disk, thus saving any space that would otherwise have been taken up with copies of the unwritten portions of the source disk.

An exemplary method according to one embodiment is broadly as follows:

The user specifies the production data 110 to be protected, the frequency of backup and the physical storage 102 to be used for backing up the data. All instructions are sent from backup controller 108 to FlashCopy control 106. Initially backup controller 108 instructs FlashCopy control 106 to create an incremental FlashCopy map of production data 110 using storage from physical storage 102 for the target disk. From then on backup controller 108 performs the steps of the method as shown in FIG. 2 when the backup system is first started and every time the period between backups expires.

Figure 2:
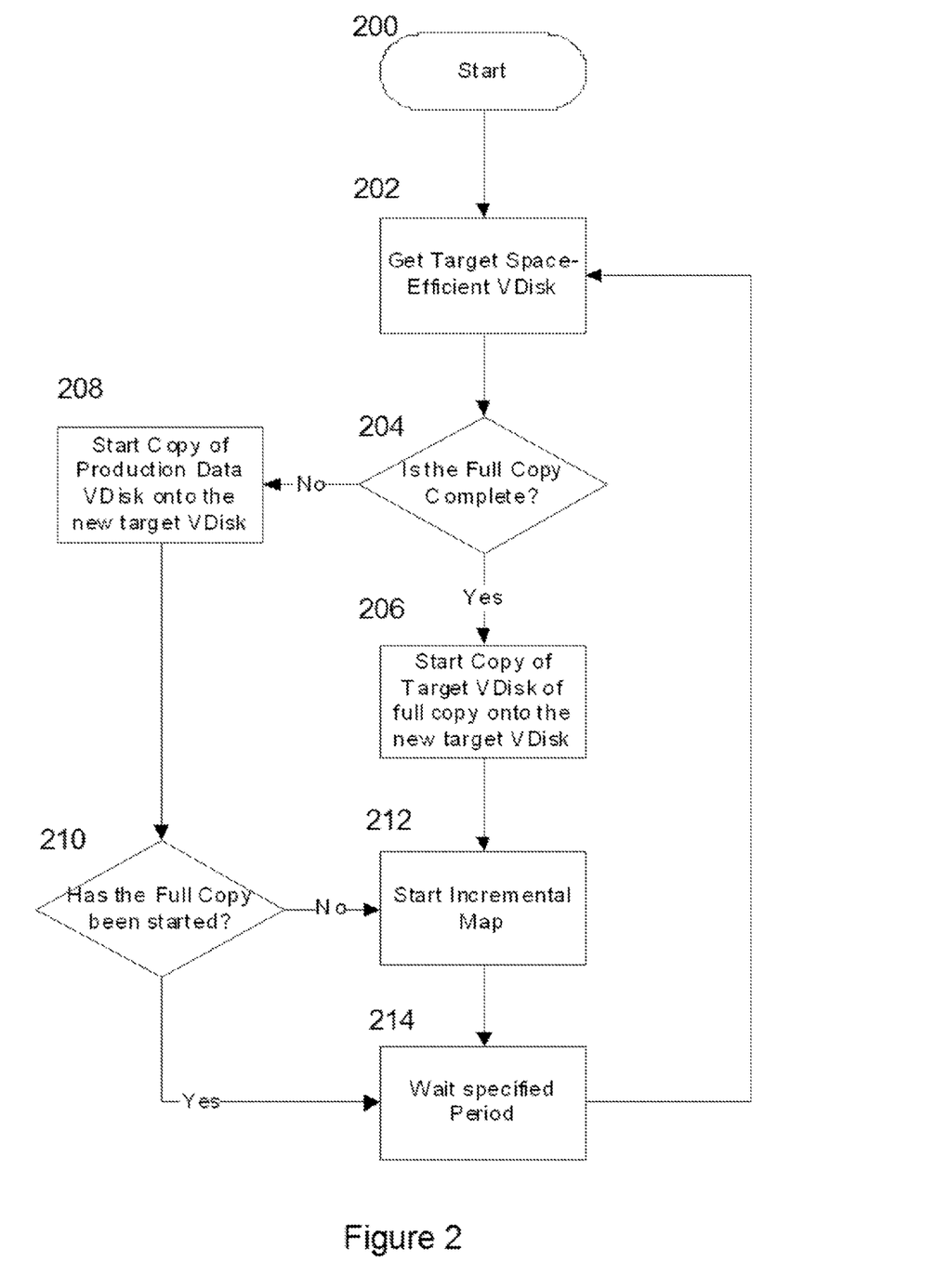
FIG. 2 is a flow diagram of exemplary replication according to one embodiment of the present invention.

The process steps or logic functions of a logic apparatus operate as shown in the flowchart of FIG. 2, in which the process begins at start step 200. At step 202 the target space-efficient Vdisk is acquired by space-efficient storage 104 on command from FlashCopy control 106 as instructed by backup controller and test step 204 determines whether the full copy is complete. If the full copy is not complete step 208 begins the copy of the production data Vdisk to the new target disk and test step 210 determines whether the full copy has been started. If the determination at test step 210 is that the full copy has been started, the process waits for the specified period at step 214 before returning to step 202. If test step 210 determines that the full copy has not been started, the incremental map is started at step 212 and the process waits for the specified period at step 214 before returning to step 202. If test step 204 determines that the full copy is complete, step 206 starts the copy of the target Vdisk of the full copy onto the new target Vdisk and then proceeds to start the incremental map at step 212. After starting the incremental map, the process waits for the specified period at step 214 before returning to step 202.

Figure 3:
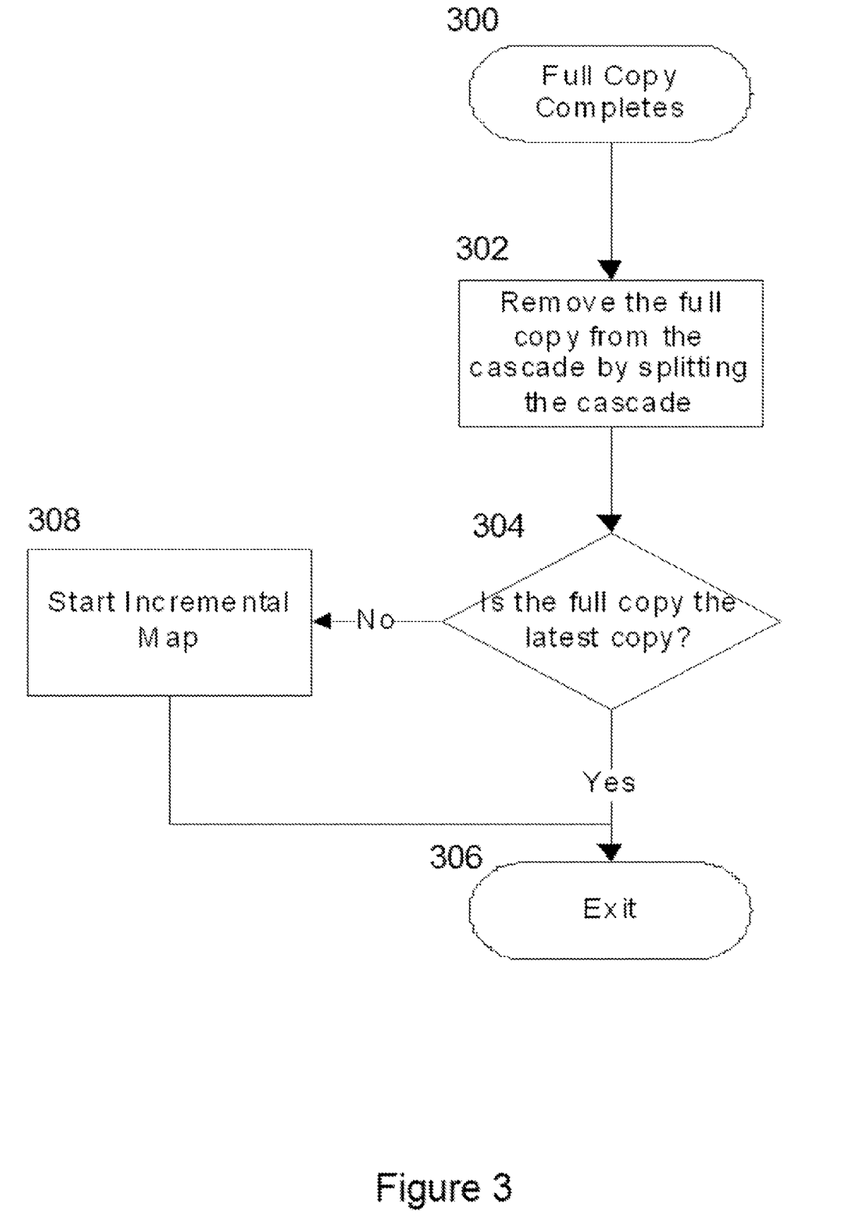
FIG. 3 is a flow diagram of exemplary replication method according to one embodiment of the present invention.

When the incremental FlashCopy completes, backup controller 108 performs the further steps of the method as shown in FIG. 3.

The process steps or logic functions of a logic apparatus operate as shown in the flowchart of FIG. 3, in which the process begins when the full copy completes at step 300. At step 302, the full copy is removed from the cascade by splitting the cascade, and test step determines whether the full copy is the latest copy. If the full copy is determined at test step 304 not to be the latest copy, step 308 starts the incremental map and the process exits at step 306. If the full copy is determined at test step 304 to be the latest copy, the process exits at step 306.

Splitting the cascade according to one embodiment relies on a method for removing a map from a cascade by means of Fdisks. An Fdisk, which is a data structure internal to Flash-Copy, is used to represent the source or target disk for a given FlashCopy mapping in the cascade. The use of Fdisks enables FlashCopy mappings to be manipulated by allowing a Vdisk to be represented in multiple cascades or at multiple points in the same cascade by different Fdisks. A first Fdisk will represent the VDisk that is being presented to the host and the other Fdisks will represent the VDisk required to maintain the cascade at other points.

The act of splitting the cascade means that, when the incremental map is retriggered, any maps downstream of the incremental map are attached to the secondary Fdisk and any Fdisks initially downstream of the secondary Fdisk are moved to the end of the cascade. This modification is possible in this case because any data on targets initially downstream of the primary Fdisk cannot be needed by the targets downstream of the secondary Fdisk.

A worked example will now be described, with reference to FIGS. 4 to 8.

Figure 4:
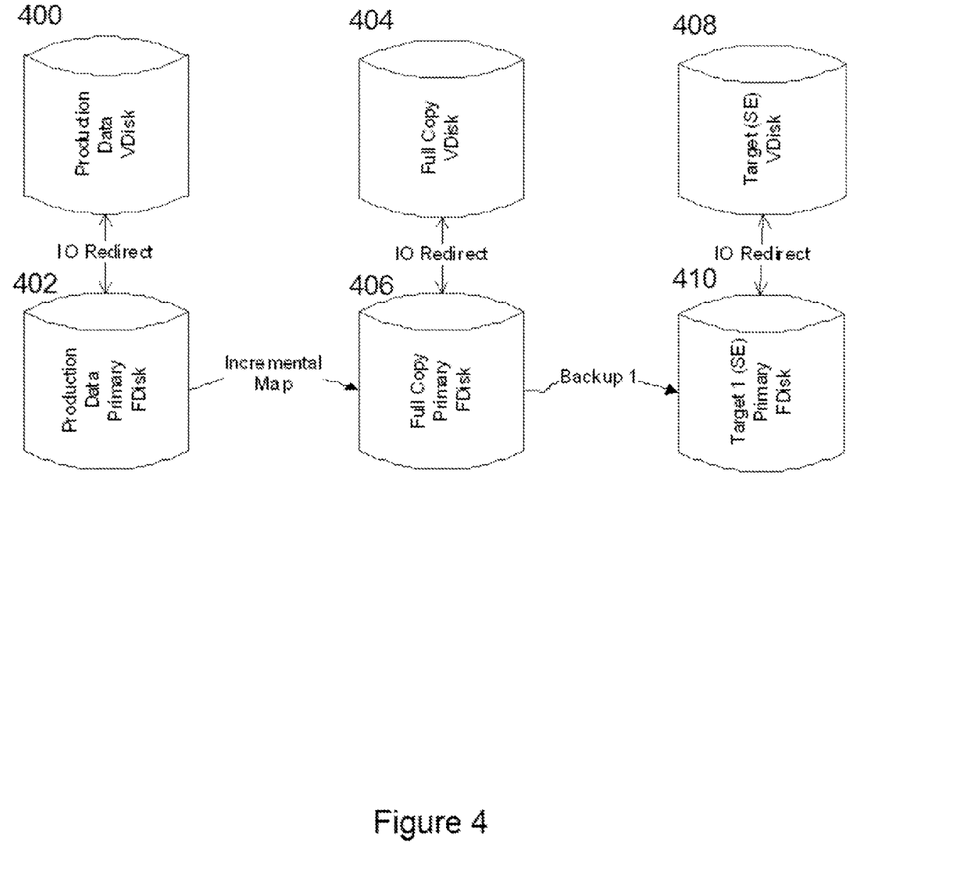
FIGS. 4 to 8 show a simplified worked example of an arrangement of storage according to an embodiment of the present invention.

Initially the arrangement of disks and contents is as shown in FIG. 4. In FIG. 4 are shown production data Vdisk 400 operatively connected for I/O redirection to production data primary Fdisk 402. Production data primary Fdisk 402 is operatively connected for incremental mapping to full copy primary Fdisk 406, which in turn is operatively connected for I/O redirection to full copy Vdisk 404. Full copy primary Fdisk 406 is operatively connected for backup to target 1 space-efficient primary Fdisk 410, which in turn is operatively connected for I/O redirection to target space-efficient Vdisk 408.

In this arrangement the production data is protected from corruption with RPO the start of the backup 1. The system is not protected from data loss until the full copy is complete. From the above arrangement we have two possibilities: either the period between backups expires before the incremental map completes or it does not. This depends on the amount of data that needs to be copied and the period used for taking the copies. So, if the full copy completes before a new copy is taken, the arrangement of disks and contents is as shown in FIG. 5.

Figure 5:
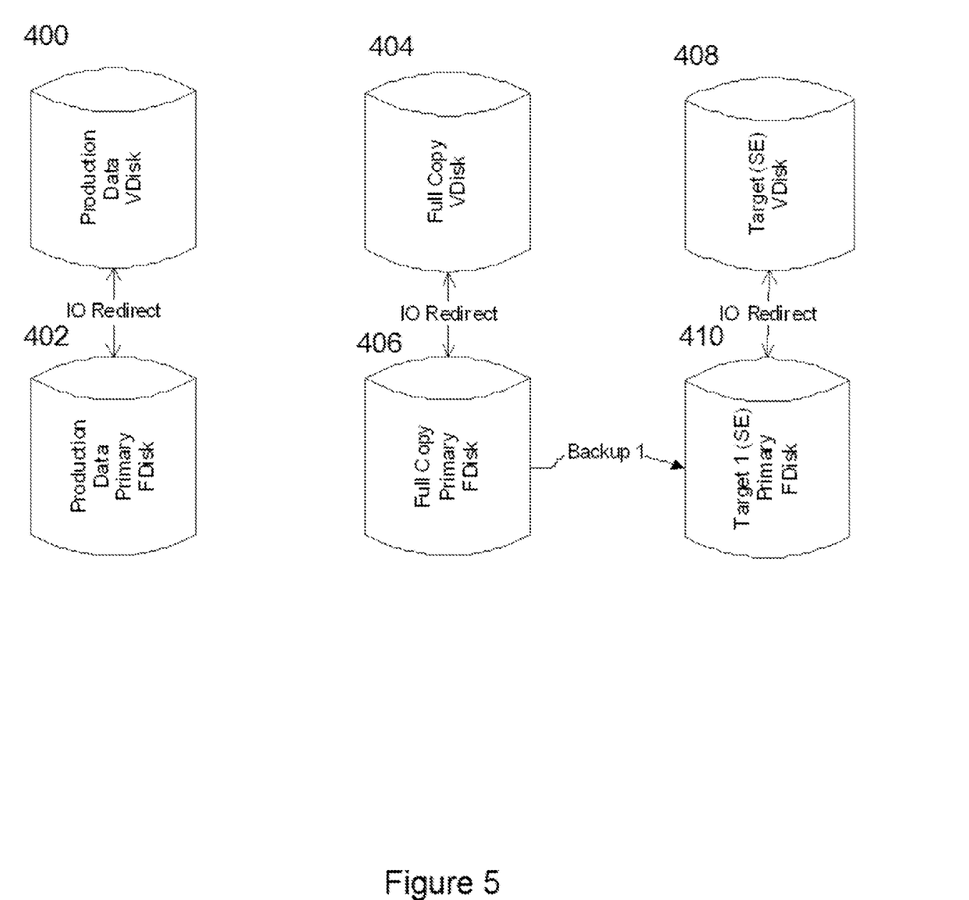

In FIG. 5, wherein the numbered references are as in FIG. 4, it can be seen that the incremental map relationship between production data primary Fdisk 402 and full copy primary Fdisk 406 has been severed.

Figure 6:
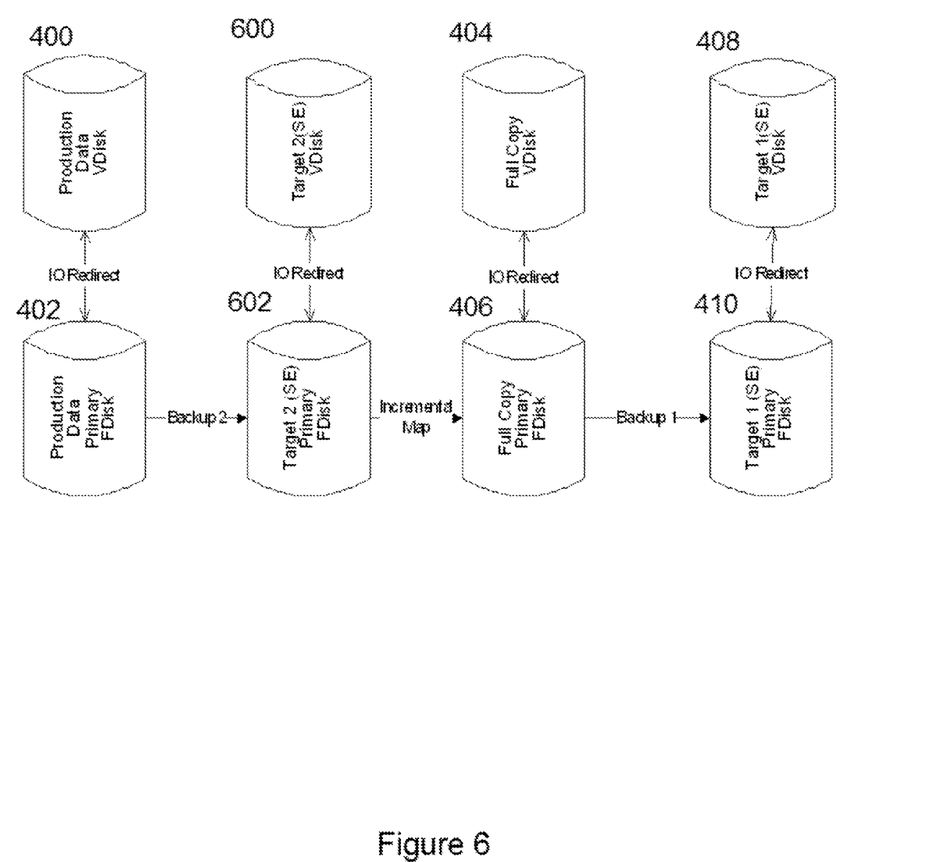

If the period expires before the incremental map completes, the arrangement of disks and contents is as shown in FIG. 6. In FIG. 6, wherein numbered references 400-410 are as in FIG. 4, it can be seen that the pairing of target 2 space-efficient Vdisk 600 and target 2 space-efficient primary Fdisk, to which it is operatively connected for I/O redirection, has been interposed between pairing 400/402 and pairing 404/406. Backup 2 relationship is now established between production data primary Fdisk 402 and target 2 space-efficient primary Fdisk 602, and incremental map relationship is now established between target 2 space-efficient primary Fdisk 602 and full copy primary Fdisk 406.

Figure 7:
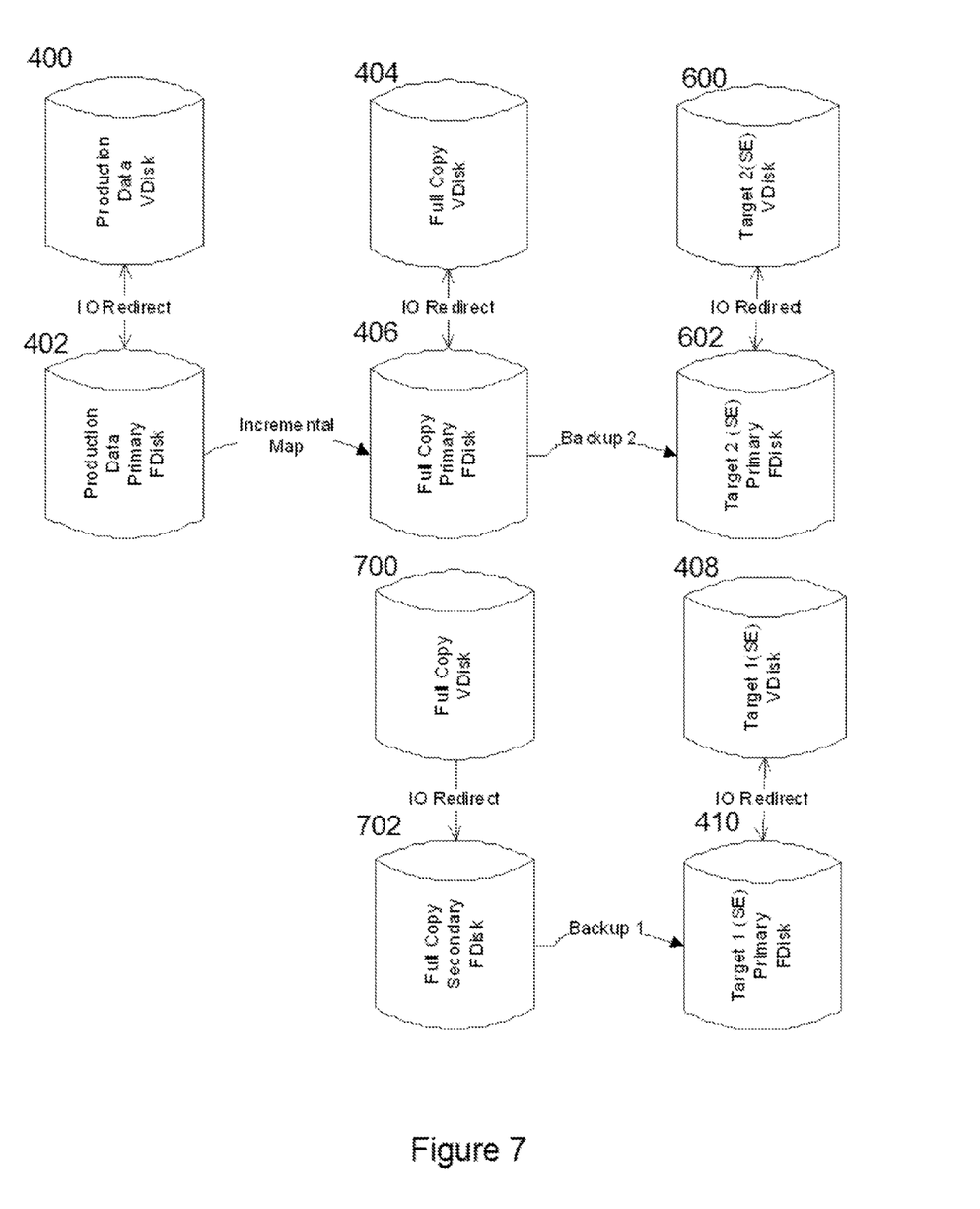

Now when the period expires in the first arrangement or the incremental map completes in the second arrangement, the arrangement of disks and contents is as shown in FIG. 7. Backup 1 continues now between the new pairing of full copy secondary Fdisk 700/full copy Vdisk 702 and the existing pairing 408/410, isolated from the incremental map relationship between pairing 400/402 and 404/406 and also from the backup 2 relationship between pairing 404/406 and 600/602.

Figure 8:
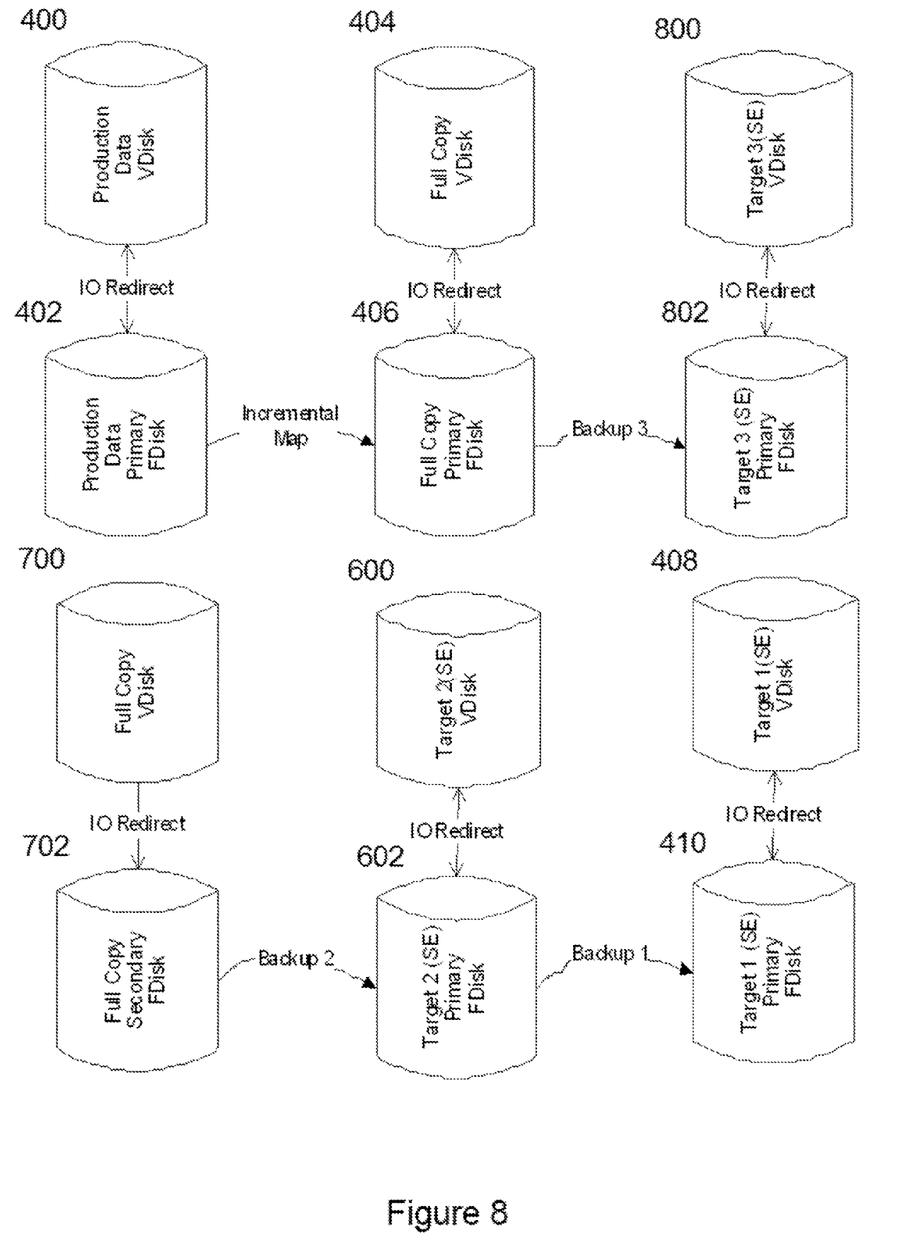

In this arrangement the production data is protected from corruption and data loss with RPO the start of backup 1. The production data is protected from data corruption with RPO the start of backup 2. When the incremental copy completes and the time-out has expired, the arrangement of disks and contents is as shown in FIG. 8, in which backup 1 and backup 2 are isolated from the production data and backup 3 relationship has been started. In this arrangement the production data is protected from corruption and data loss with RPO the start of the backup 2.

Thus it can be seen that this method allows backups (and in particular, space-efficient backups) to be collected that protect the production data from data loss and data corruption. These copies subsequently maintain this level of protection. It will be clear to one of ordinary skill in the art that, because of the removal of dependencies as described herein, the user can conveniently remove copies that are no longer needed, and that the production data can be recovered from any backup copy.

Embodiments of the invention thus provide an apparatus and method for providing periodic data backups while reducing the risk of data corruption or loss. It will be clear to one of ordinary skill in the art that all or part of the method of one embodiment of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to one embodiment of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, one embodiment of the present invention may be realized in the form of a computer implemented method of deploying a service comprising steps of deploying computer program code operable to cause the computer system to perform all the steps of the method when deployed into a computer infrastructure and executed thereon.

In a further alternative, one embodiment of the present invention may be realized in the form of a data carrier having functional data thereon, the functional data comprising functional computer data structures to, when loaded into a computer system and operated upon thereby, enable the computer system to perform all the steps of the method.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for ensuring periodic data backup control in a virtualized storage system having a point-in-time copy function operable to copy first data into a cascade and comprising steps of:

creating an incremental map of production data using storage from a physical storage associated with a target virtual disk;

selecting, by a storage targeting component, the target virtual disk for one of a full copy or an incremental copy of the first data;

triggering, by a periodic backup component, a periodic point-in-time copy of the first data to a virtual disk in the cascade;

testing, by a testing component, a status of the full copy, the incremental copy and the periodic point-in-time copy; and responsive to the status, splitting, by a cascade splitting component, the cascade to remove a dependency relationship of at least one of the full copy, the incremental copy and the periodic point-in-time copy on the first data, and to insert a second target virtual disk between the first data and the full copy, the incremental copy, and the periodic point-in-time copy, wherein:

prior to the splitting of the cascade, the first data is located at a first position in the cascade, and the full copy, the incremental copy, and the periodic point-in-time copy are arranged in and make up a first configuration of components located in a second position downstream from the first position, during the splitting of the cascade, the second target virtual disk is inserted immediately adjacent the first data between the first position and the second position, and as a result of the splitting of the cascade the first data remains at the first position, the second target virtual disk is re-positioned at a location not immediately adjacent the first data, the full copy, the incremental copy, and the periodic point-in-time copy are rearranged into a second configuration that is different from the first configuration of components, and the first target virtual disk is isolated from the cascade and attached to a new virtual disk.

2. The method of claim 1, wherein the cascade is controllable by means of a relocatable cascade disk mapping.

3. The method of claim 1, wherein the point-in-time copy function comprises FlashCopy.

4. The method of claim 3, wherein the relocatable cascade disk mapping comprises a FlashCopy Fdisk.

5. The method of claim 1, wherein the at least one of the full copy, the incremental copy and the periodic point-in-time copy comprises a space-efficient copy.

6. The method of claim 1, wherein the second position is downstream from the first position in the cascade.

7. The method of claim 6, wherein the second position is at the end of the cascade.

* * * * *